Figure 6:
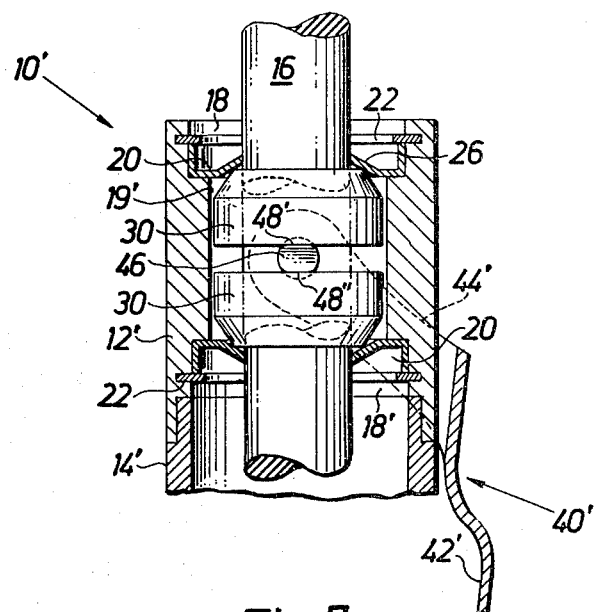

United States Patent [19]

Carlsson

[11] 4,236,609
[45] Dec. 2, 1980

[54] RELEASABLE LOCKING DEVICE FOR PIPES, SHAFTS AND THE LIKE

[75] Inventor: John Carlsson, Oskarshamn, Sweden

[73] Assignee: Stiftelsen Kalmarsundsgruppen, Kalmar, Sweden

[21] Appl. No.: 963,929

[22] Filed: Nov. 27, 1978

[30] Foreign Application Priority Data

Dec. 14, 1977 [SE] Sweden .................................. 7714229

[51] Int. Cl.² ............................................ B65H 59/10
[52] U.S. Cl. ............................... 188/67; 403/33; 403/109; 403/343; 248/411; 192/65
[58] Field of Search ................. 403/33, 109, 343, 373; 188/67; 105/499, 500, 501; 285/340, 310, 312; 248/336, 337, 335, 411

[56] References Cited

U.S. PATENT DOCUMENTS

| | | | |
|---|---|---|---|
| 2,341,465 | 2/1944 | Monnot | 188/67 |
| 2,707,108 | 4/1955 | Schottler | 188/67 X |
| 2,744,436 | 5/1956 | Ross | 188/67 X |
| 3,506,287 | 4/1970 | Lampert | 188/67 X |
| 3,746,301 | 7/1973 | Budzich et al. | 188/67 X |

FOREIGN PATENT DOCUMENTS 6700801  7/1967  Netherlands ............................ 285/340

Primary Examiner—Wayne L. Shedd
Attorney, Agent, or Firm—Blanchard, Flynn, Thiel, Boutell & Tanis

[57] ABSTRACT

A locking device for two parts, mutually displaceable telescopically, e.g. a rod glidable in an outer tube, and including a washer with resilient serrations or teeth bent slopingly upwards out of the plane of the washer, which is retained in one part while its teeth engage the other part. An operating means is adapted for urging an annular lifting means into engagement with the teeth on actuation in one direction, so that the teeth are deflected out of engagement, allowing free movement between the parts, until they regain their engagement when the operating means is moved in the opposite direction.

9 Claims, 7 Drawing Figures

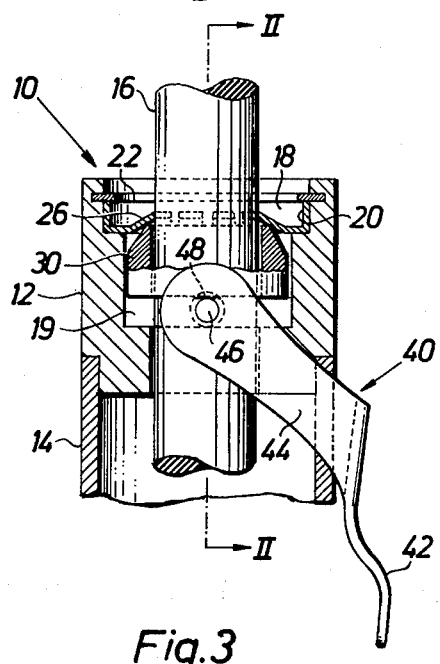
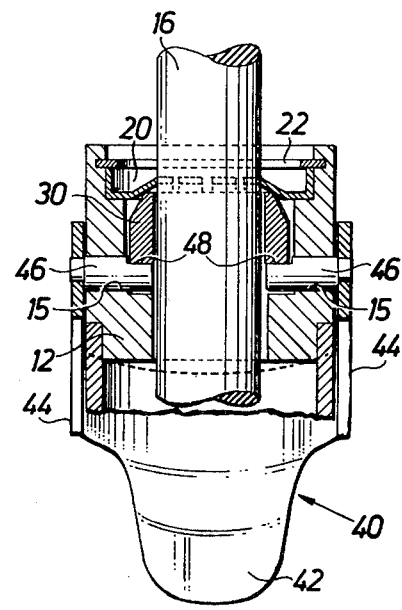
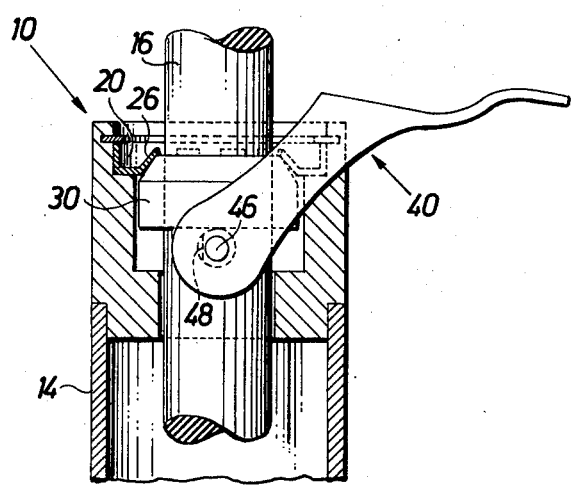
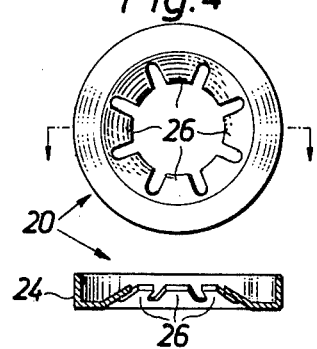
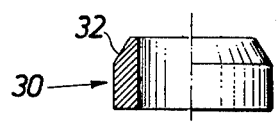

RELEASABLE LOCKING DEVICE FOR PIPES, SHAFTS AND THE LIKE

The present invention relates to a releasable locking device, with the help of which a supporting element in the form of a tubular pillar, bar or the like can be fixed in an optional position in a rigid or foundation part. Usually, this part has tubular form itself, so that a unit consisting of two pipe or bar parts telescopically displaceable in each other can be mutually fixed to obtain optional desired length. The locking device according to the invention is intended inter alia for use with chairs which are adjustable in height, thus enabling a vertical pillar carrying the chair seat to be fixed at an optional height in the lower supporting structure of the chair. The device can however be also used in such special carrying or holder means as microphone stands, where the microphone is carried in the upper end of a tubular rod which is telescopically displaceable in an outer sleeve or tubular pillar, the invention then permitting the movable microphone rod to be locked at an optimal height in a simple way.

Locking means of this general type are already known in several designs, where, as mentioned above, they are most often used for fixing two tubular parts telescopically displaceable in each other in an optional postion. According to one design principle, the inner part or bar portion is provided with an expandable body which is caused to expand against the inside of the outer tubular part, thereby to create a frictional lock between the parts, or vice versa, the outer tubular part is provided with a contractable body which, in an analogous way, clamps about the inner tubular part. According to another design principle, one of the telescopic parts is provided with wedges or tipping washers engaging against the other part, so that the lock between the parts is provided by wedging action. However, a problem in the known devices is to provide a locking mechanism which is simple, robust and easily operated, at the same time as the locking engagement is gentle and does not cause deformations or marks in the locking surfaces.

The invention thus has the object of providing a locking means of the kind in question which gives a positive, but at the same time readily releasable lock using simple and cheap components. The object is achieved, and the drawbacks mentioned above in connection with already known wedge or friction locking means of a similar kind are circumvented by the device according to the invention being given the distinguishing features disclosed in claim 1.

The invention will now be described while referring to the attached drawings, in which FIG. 1 shows a first embodiment of the locking device according to the invention applied to the outer tube of a telescopically adjustable pillar, the figure being partly shown in a longitudinal section, FIG. 2 is a section along the line II—II in FIG. 1, while FIG. 3 is a figure corresponding to FIG. 1 but showing the locking device in the open or free position, FIG. 4 shows a plan view of, and a cross section through, a spring washer included in the locking device, while FIG. 5 shows a partially sectioned side view of an operating sleeve.

Figure 7:
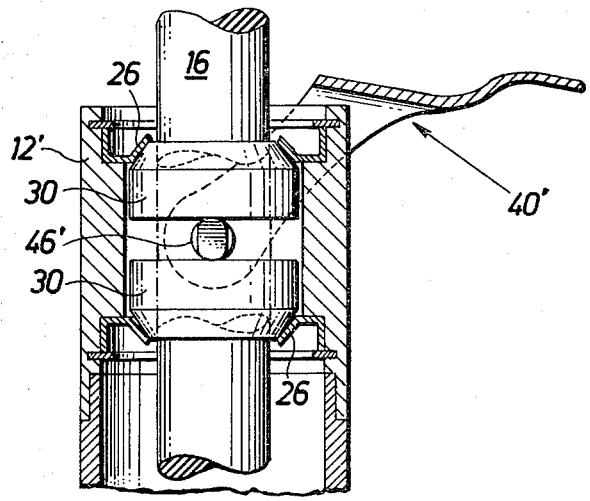

FIGS. 6 and 7 finally show a modification of a locking device according to the invention in the locked position and free position, respectively.

As is apparent from FIGS. 1-3, the exemplified locking device, denoted in its entirety by the numeral 10, includes a fixed sleeve 12, e.g. joined to a tube 14 incorporated in a foundation or base structure. A rod or pillar 16 passes centrally through the sleeve 12, and by means of the locking device according to the invention the pillar is adapted for displacement vertically in the sleeve, to be fixed therein at a position selected optionally.

There is a recess 18 in the upper portion of the sleeve 12, accommodating a special lock washer 20. This lock washer, which will shortly be described, is kept in place in the recess 18 by means of an interior spring clip 22.

The lock washer 20, shown in detail in FIG. 4, consists of hardened spring material, preferably spring steel, and is expediently made with a circumferential stiffening flange 24, perpendicular to the flat portion. As is apparent from FIG. 4, the lock washer 20 has a central opening surrounded by a plurality of spring tongues 26, bent up somewhat, as seen in the figure, and thus forming a certain angle deviating from 90° to the axis of the washer. With the lock washer accommodated in the recess 18 as shown in FIG. 1, i.e. with the tongues 26 directed upwards, these will engage with the central pillar 16, which will be effectively prevented from moving downwards by the upwardly sloping tongues; its movement upwards, on the other hand, is allowed while overcoming the friction exercised by the tongues against the pillar.

The recess in the sleeve 12 merges into a second recess 19 having a lesser diameter, and in this there is accommodated an operating sleeve 30, see FIG. 4, the upper portion of which is bevelled at 32. The operating sleeve is easily slidable in relation to the pillar 16, and it is placed with its upper, bevelled end 32 immediately under the tongues 26 of the lock washer 20, while its lower end is supported in a way to be described below.

An operating arm 40, see FIGS. 1-3, consists of a handle portion 42, united with a pair of limbs 44 extending forward on either side of the fixed sleeve 12, see especially FIG. 2. As is also apparent from FIG. 2, the ends of the limbs 44 are each provided with a cylindrical stud 46 extending radially into through-openings 15 in the wall of the sleeve 12, the studs being placed diametrically opposite each other. At their inner ends the studs 46 have milled flats 48, and in the position shown in FIGS. 1 and 2 the operating sleeve 30 is accommodated with negligible play between the spring tongues 26 of the lock washer 20 and the flats 48 on the studs 46 of the operating arm, as is clearly shown in FIGS. 1 and 2. In this position the tongues 26 thus have an undisturbed locking engagement against the pillar 16.

If the operating arm 40 is moved upwards to the position shown in FIG. 3, its studs 46 will accompany the swing so that the operating sleeve 30 is forced to leave the flats 48 and glide up onto the circular portion of the studs, which means that the operating sleeve 30 is moved upwards a small distance with great force. The sleeve hereby engages with the tongues 26 of the lock washer 20 to bend these upwards somewhat, so that they release their grip on the pillar 16, which can now be freely displaced in the outer sleeve 12. When a new position has been selected for the pillar, the operating arm 40 is swung downwards again, for the spring tongues 26 of the lock washer to regain their engagement.

As has been described above, locking in the sleeve 12 in the embodiment of the pillar 16 shown in FIGS. 1-3 is absolute in a downward direction, but only relative in an upward direction, i.e. the pillar can be displaced in this direction while overcoming the (great) friction of the spring tongues. This functional mode is quite sufficient for most purposes, but the structure can be easily supplemented so that it gives positive locking in both directions, which is illustrated in FIGS. 6 and 7.

In the embodiment according to FIG. 6 and 7, several details are the same as in the embodiment according to previously mentioned figures, while others have been modified somewhat, these details being given the same reference denotations as in FIGS. 1-3, but provided with prime or double prime signs.

As before, a pillar 16 is telescopically displaceable in a tube 14', provided at its upper end with a sleeve 12' accommodating a "double-acting" friction lock device according to the invention. The upper part of this is in complete conformity with the embodiment according to FIGS. 1-3, i.e. a lock washer as above is accommodated in a recess 18 in the sleeve 12', this washer being retained in the recess by means of a spring clip 22. An operating sleeve 30 is accommodated under the lock washer 20 in an opening 19' in the outer sleeve 12', and as previously, the operating sleeve 30 fits with insignificant play between the underside of the teeth or tongues 26 of the lock washer 20 and the flats 48' on the studs 46', which project inwardly from the limbs 44' of an operating arm 40', all in agreement with the previous description, In this case the lock washer-operating sleeve unit is duplicated, as shown in FIG. 6, i.e. the outer sleeve 12' is also provided with a lower recess 18' in which a further lock washer 20 retained by a spring clip 22 is accommodated, this lower lock washer being in opposed relationship to the upper lock washer. A lower operating sleeve 30, reversed in a similar way to the upper operating sleeve 30, is accommodated between the lower lock washer 20 and lower flats 48" on the operating studs 46', the flats 48' and 48" being parallel, as is apparent from FIG. 6.

The lower part of the double-acting locking device 10' can thus be regarded as a mirror replica of the upper part, and both parts work in the same way as described previously: When the handle portion 42' of the operating arm 40' is swung up, both operating sleeves 30 are caused to glide up on the cylindrical surfaces of the operating studs 46', and thereby the sleeves force the tongues 26 of the lock washers 20 to release their engagement with the pillar 16, so that the latter can be displaced freely in the outer sleeve 12'. When the operating arm is swung back again and the lock washers regain their engagement, there will be a total positive lock, i.e. the pillar 16 is locked against movement in both directions.

The invention is not limited to the exemplified embodiments, and a plurality of modifications can be made within the scope of the invention. Thus, for example, the lock washer 20 can be provided with teeth or tongues along its outer edge instead of along its inner edge, these radially outwardly directed teeth being brought to engage for locking against the inside of an outer tube portion, for selectively being deflected to the free position with the help of an operating sleeve, in principle of the same kind as the sleeve 30 described above. One skilled in the art should also be able to propose other structural variations of the invention.

I claim:

1. A telescopeable assembly comprising an outer tubular member receiving an inner member for relative axial displacement therebetween, a locking device rigidly connected with said outer member for locking said members in any selected relative position, an operating means for manually actuating said locking device to thereby place said locking device into either a locking position in which it engages said inner member so that the members are fixed in a desired adjusted position relative to each other, or a free position, in which both members are mutually freely displaceable, wherein said locking device comprises the combination of (a) a locking element in the form of an annular washer surrounding the inner member and having radially directed resilient teeth permanently upstanding obliquely from the plane of the washer and adapted for engaging with said inner member in said locking position, (b) a lifting annulus located adjacent the teeth of the washer and surrounding the inner member, and (c) a pivotable cam member mounted adjacent the lifting annulus and responsive to actuation of said operating means for urging said lifting annulus into contact with said teeth and bending them against their resilience to a free position further out of the plane of the washer and out of their locking engagement to place the locking device in its said free position.

2. A telescopeable assembly, comprising:
an outer tubular member and an inner elongate member received within said outer tubular member for relative axial displacement therebetween;
an annular washer fixed within said outer member and surrounding said inner member, said annular washer having radially directed resilient teeth permanently upstanding obliquely from the plane of the washer and normally engaging said inner member for locking said inner member against relative movement with respect to said outer member in at least one direction;
shaft means extending transversely into said outer member and axially spaced from said washer with a lifting sleeve interposed therebetween, said shaft means including eccentric means within said outer member and backing said sleeve;
handle means fixed to said shaft means and pivotable for causing said eccentric means to urge said sleeve into unlocking engagement with said washer.

3. The apparatus of claim 2 in which said shaft means comprises a pair of studs disposed coaxially opposite each other and pivotally mounted in said outer member, the outer ends of said studs being fixed to said handle means for pivoting thereby, the inner ends of said studs facing each other and carrying said eccentric means, said eccentric means engaging said sleeve and being responsive to swinging of said handle means for displacing said sleeve.

4. The apparatus of claim 3 including two said annular washers and two said lifting sleeves, said sleeves being placed between said washers and arranged for displacement in opposing directions to engage the teeth of said washers, said eccentric means on the inner ends of said studs including portions simultaneously engageable with the two sleeves for displacing same away from each other in opposite directions and thereby into engagement with the teeth of said washers for displacing same out of locking engagement with said inner member in response to pivoting of said handle means.

5. The apparatus of claim 3 in which said studs are axially spaced apart by interposition of said elongate inner member therebetween, said studs lying substantially on a diameter of said inner member and diametrally underlying said sleeve with two said eccentric means supporting diametrally opposed portions of said sleeve.

6. The apparatus of claim 5 in which said eccentric means comprise flats arranged chordally in the inner ends of said studs.

7. The apparatus of claim 2 in which said handle means comprises a substantially U-shaped member loosely diametrally straddling said outer member, said U-shaped member being made up of a pair of legs joined by a bight, with the free ends of the legs fixed to outer ends of said shaft means protruding from said outer member, the length of said legs being greater than the radius of said outer member so that said bight can swing with said legs through an arc without striking said outer member, said handle means further including a lever extending from said bight and movable generally along the axial direction of said outer member for pivoting said shaft means.

8. The apparatus of claim 2 in which said lifting sleeve has a frustoconical nose, the tapered face of which is engageable with said teeth of said annular washer and received in a substantially conical pocket formed between said obliquely extending teeth and inner member, said washer having an axially extending peripheral flange, and including a spring clip received in an annular groove in said outer member and backing said peripheral flange of said annular washer against unlocking movement of said lifting sleeve against said washer teeth.

9. The apparatus of claim 3 in which said assembly is an upstanding telescopic support, said outer member defining the base of said support assembly and said inner member being vertically adjustable with respect to said support base to support an object at a desired height thereabove.

* * * * *